US008712045B2

(12) United States Patent
Dubhashi et al.

(10) Patent No.: US 8,712,045 B2
(45) Date of Patent: Apr. 29, 2014

(54) DIGITAL RIGHTS MANAGEMENT FOR MEDIA STREAMS

(75) Inventors: Kedarnath A. Dubhashi, Redmond, WA (US); Majd Bakar, San Jose, CA (US); Douglas Steedman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 12/683,680

(22) Filed: Jan. 7, 2010

(65) Prior Publication Data

US 2011/0164753 A1 Jul. 7, 2011

(51) Int. Cl.
*H04L 29/06* (2006.01)
*H04L 9/08* (2006.01)

(52) U.S. Cl.
CPC ........................................ *H04L 9/08* (2013.01)
USPC ............................................ 380/45; 713/150

(58) Field of Classification Search
USPC ..................... 713/150–190; 380/45
See application file for complete search history.

(56) References Cited

U.S. PATENT DOCUMENTS

| 7,239,708 B2 | 7/2007 | England et al. | |
| 2003/0097655 A1* | 5/2003 | Novak | 725/31 |
| 2005/0114896 A1 | 5/2005 | Hug et al. | |
| 2005/0251487 A1* | 11/2005 | Evans et al. | 705/59 |
| 2005/0273629 A1* | 12/2005 | Abrams et al. | 713/189 |
| 2006/0242078 A1* | 10/2006 | Evans et al. | 705/59 |
| 2007/0083469 A1 | 4/2007 | Kaufman | |
| 2007/0185815 A1 | 8/2007 | Boccon-Gibod et al. | |
| 2007/0204078 A1* | 8/2007 | Boccon-Gibod et al. | 710/54 |
| 2008/0066181 A1* | 3/2008 | Haveson et al. | 726/26 |
| 2008/0168523 A1* | 7/2008 | Ansari et al. | 725/131 |
| 2008/0222044 A1* | 9/2008 | Gottlieb et al. | 705/59 |
| 2009/0037382 A1* | 2/2009 | Ansari et al. | 707/3 |
| 2009/0217343 A1 | 8/2009 | Bellwood et al. | |
| 2009/0240944 A1* | 9/2009 | Cho et al. | 713/175 |
| 2010/0138903 A1* | 6/2010 | Medvinsky | 726/6 |

OTHER PUBLICATIONS

"Digital Video Broadcasting (DVB); IP Datacast over DVB-H: Service Purchase and Protection", Retrieved at http://www.dvb.org/technology/standards/a100.tm3455r5.cbms2298.IPDC_SPP.revC.pdf, DVB Document A100, Jul. 2009, pp. 300.
Valverde, et al., "Digital Rights Management", Retrieved at http://www.icg.isy.liu.se/project/stb/docs/valverde.pdf>>, Jul. 15, 2003, pp. 161.

* cited by examiner

*Primary Examiner* — Chau Le
*Assistant Examiner* — Don Zhao
(74) *Attorney, Agent, or Firm* — Micah Goldsmith; Glen Johnson; Micky Minhas

(57) ABSTRACT

This document describes techniques and apparatuses enabling application of digital rights management (DRM) to media streams. In one embodiment, three license levels are used to protect numerous television channels without undue use of computing resources.

16 Claims, 6 Drawing Sheets

DIGITAL RIGHTS MANAGEMENT FOR MEDIA STREAMS

BACKGROUND

Digital rights management (DRM) systems have been successfully used to protect distribution of discrete media files, such as Internet-downloaded music, music videos, and movie files. DRM systems, however, require significant computing resources to implement, which often makes these systems too resource-intensive to apply to media streams, such as linear television.

SUMMARY

This document describes techniques and apparatuses enabling application of digital rights management (DRM) to media streams. In one embodiment, three license levels are used to protect numerous television channels without undue use of computing resources.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes techniques and apparatuses for applying digital rights management (DRM) to media streams. Conventional DRM approaches applied to a media stream would be resource intensive, such as by requiring a license bound to each user or user's device or domain for each 30-minute block of each media stream received by the user. In such a case, an asymmetric-key algorithm is performed for each user, each stream, and each 30-minute block. For 100,000 users, 1,000 streams, and forty-eight 30-minute blocks per channel per day, the total number of asymmetric-key algorithms needed by this method per day is 4,800,000,000 (4.8 billion). In one particular embodiment, this document describes techniques for applying DRM to media streams that would use about 100,000 asymmetric-key algorithms per day instead of 4.8 billion.

Example Environment

Figure 1:
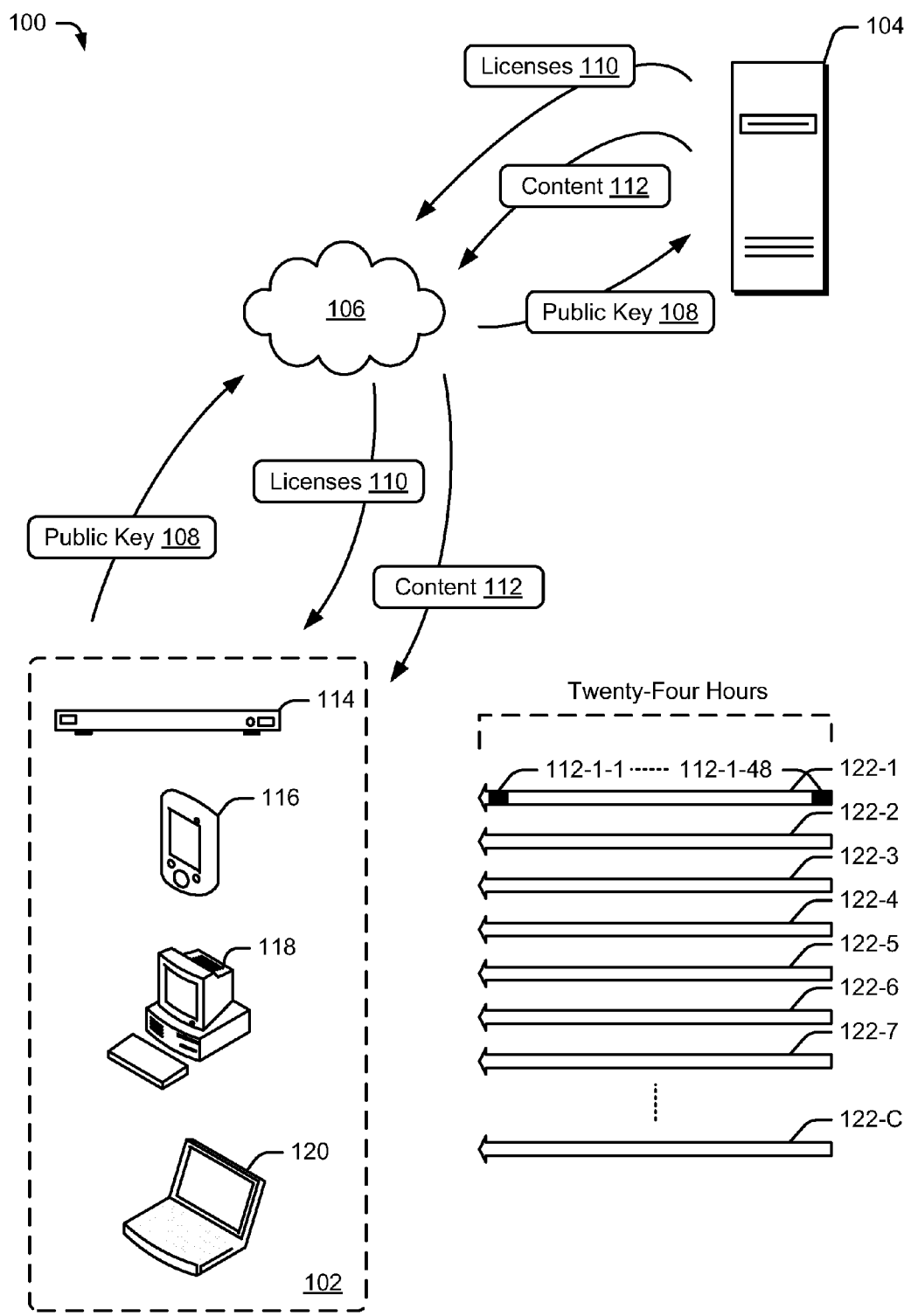
FIG. 1 illustrates an example environment for applying DRM to media streams.

FIG. 1 illustrates an example environment 100 for applying DRM to media streams. Environment 100 includes a computing device 102 and a license provider 104, which communicate through communication network 106. Generally, computing device 102 provides a public key 108 to license provider 104, which uses public key 108 as part of an encryption scheme to enable secure delivery of content of media streams. As part of this scheme, license provider 104 provides licenses 110 and content 112. Computing device 102 decrypts content 112 using licenses 110.

Computing device 102 can be any device capable of receiving and decrypting content from a media stream, though it is illustrated with example devices including a set-top box 114, a smart-phone 116, a desktop computing device 118, and a laptop computing device 120. License provider 104 can be any device capable of encrypting and/or providing a license, and may include one or more servers and/or other computing devices. Communication network 106 may include the Internet, a local-area network, a wide-area network, a wireless network, and/or a USB hub, to name a few.

Content 112 includes music, movies, television programs, or other content. Content 112 is a particular block of content of a media stream. By way of example, consider media streams that each provides a television channel having twenty-four hours of content per day. In such a case content 112 is a program, song, or portion or combination of these, such as a 30-minute block of songs, one half of an hour-long television show, or an entire movie.

To further illustrate media streams received by computing device 102, consider linearly delivered television channels 122 (numbered 1 to C). Media streams, such as linearly delivered television channels 122, have a remote or no beginning or end, and to this extent are analogous to radio and television broadcasts, at least to the extent of the period of the content being protected. Contrast this type of media delivery to that of discrete media files, which have a beginning and end. Note also that media streams are generally uninterrupted across different programs or songs, though this is not required for application of the techniques described herein.

Television channels 122 are shown with a twenty-four hour period over which the channels provide television programs. Here many different blocks of content 112 are potentially received, each being a thirty-minute block from one of channels 112. Thus, there are forty-eight blocks of content 112 for each of channels 122, for a total of 48*C blocks of content 112 available in a day. With many television channels, such as C=1000, twenty-four hours of these channels have 48,000 different blocks of content 112. For two such examples of content 112, consider content 112-1-1 and 112-1-48, representing a first and a forty-eighth block of content 112 of channel 122-1.

Figure 2:
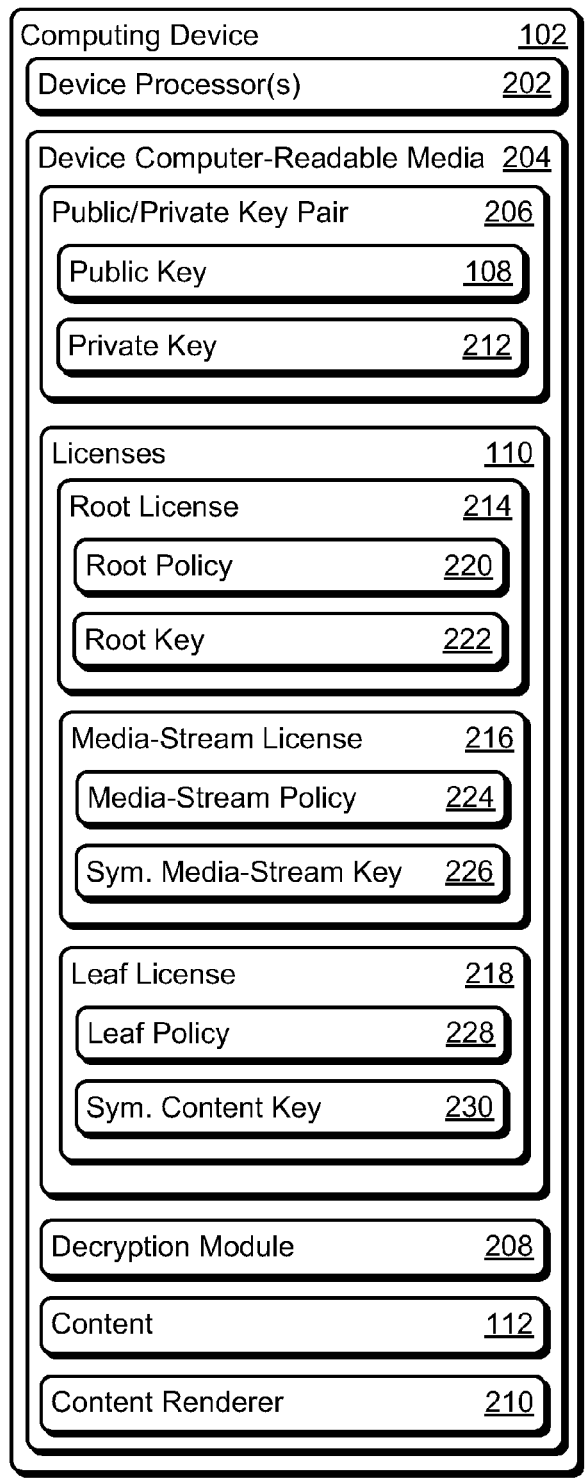
FIG. 2 illustrates example entities of a computing device.

FIG. 2 illustrates example entities of computing device 102. Computing device 102 includes device processor(s) 202 and device computer-readable media 204. Device computer-readable media 204 contains or has access to a public/private key pair 206, licenses 110, a decryption module 208, one or more content 112, and content renderer 210. As noted in FIG. 1, computing device 102 receives licenses 110 and content 112 from license provider 104, which is illustrated in greater detail in FIG. 3.

Private/public key pair 206 includes public key 108 and private key 212. Information encrypted using public key 108 and an asymmetric-key algorithm can be decrypted using private key 212 by decryption module 208.

Licenses 110 include a root license 214, one or more media-stream licenses 216, and one or more leaf licenses 218.

Root license 214 is bound to computing device 102 and/or a user of computing device 102. Root license 214 can be bound by being encrypted using public key 108 of public/private key pair 206 where private key 212 is known to computing device 102 but is not known by other entities. Root license 214 includes a root policy 220 and root key 222. Each media-stream license 216 includes a media-stream policy 224, each of the media-stream licenses 216 being associated with a different media stream. Each media-stream license 216 also includes a symmetric media-stream key 226.

Each of leaf licenses 218 includes a leaf policy 228 and a symmetric content key 230, with each leaf license 218 associated with a particular block of content 112 of a media stream. Symmetric content key 230 is used by decryption module 208 to decrypt a particular block of content 112, thereby permitting content renderer 210 to render that content 112 for a user of computing device 102. Note that each of the licenses includes a policy, this policy can set out permitted uses for the user (in the case of root policy 220), for the media stream (in the case of media-stream policy 224), and for a block of content 112 (in the case of leaf policy 228). These policies may be used to govern various aspects of computing device 102's use of content and the like. These techniques, however, may forgo including policies in the licenses.

Figure 3:
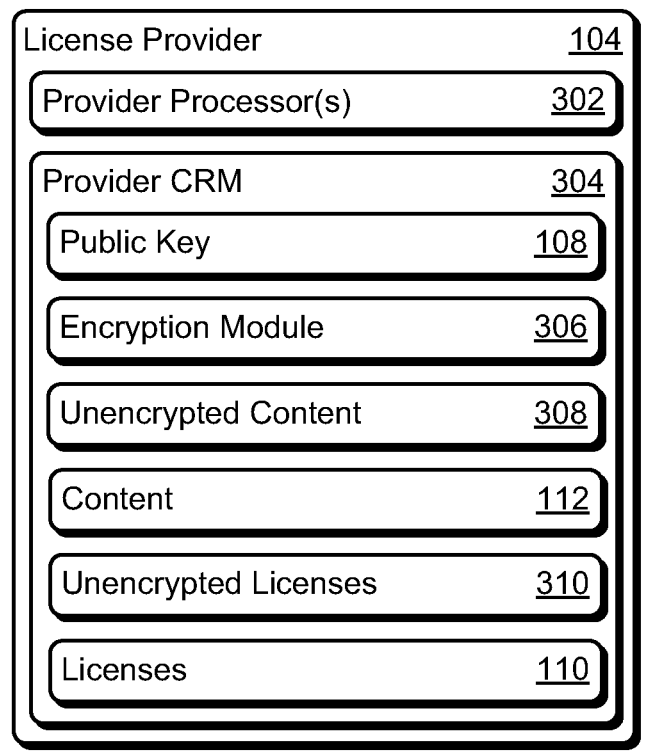
FIG. 3 illustrates example entities of a license provider.

FIG. 3 illustrates example entities of license provider 104. License provider 104 includes provider processor(s) 302 and provider computer-readable media (CRM) 304. Provider computer-readable media 304 contains or has access to public key 108 (and may have other public keys for other computer devices or their users), encryption module 306, unencrypted content 308, content 112, unencrypted licenses 310, and licenses 110. As noted in FIG. 1, license provider 104 provides licenses 110 and content 112 to computing device 102. For brevity, licenses 110 are illustrated in detail in FIG. 2 but not in this figure.

Note that one or more of the entities shown in FIG. 1, 2, or 3 may be further divided, combined, and so on. License provider 104, for example, may be divided, with one entity providing licenses and another providing content. Thus, the environment 100 of FIG. 1 illustrates some of many possible environments capable of employing the described techniques.

Generally, any of the techniques and abilities described herein can be implemented using software, firmware, hardware (e.g., fixed-logic circuitry), manual processing, or a combination of these implementations. The entities of environment 100 generally represent software, firmware, hardware, whole devices or networks, or a combination thereof. In the case of a software implementation, for instance, the entities (e.g., decryption module 208 and encryption module 306) represent computer-executable instructions (e.g., program code) that perform specified tasks when executed on a processor (e.g., CPU or CPUs). The program code can be stored in one or more computer-readable memory devices, such as computer-readable media 204 or 304. The features and techniques described herein are platform-independent, meaning that they may be implemented on a variety of commercial computing platforms having a variety of processors.

Example Processes

The following discussion describes processes that operate to apply digital rights management to media streams. Aspects of these processes may be implemented in hardware, firmware, software, or a combination thereof. These processes are shown as sets of blocks that specify operations performed, such as through one or more entities or devices, and are not necessarily limited to the order shown for performing the operations by the respective blocks. In portions of the following discussion reference may be made to environment 100 of FIG. 1, as well as FIGS. 2, 3, and 5.

Figure 4:
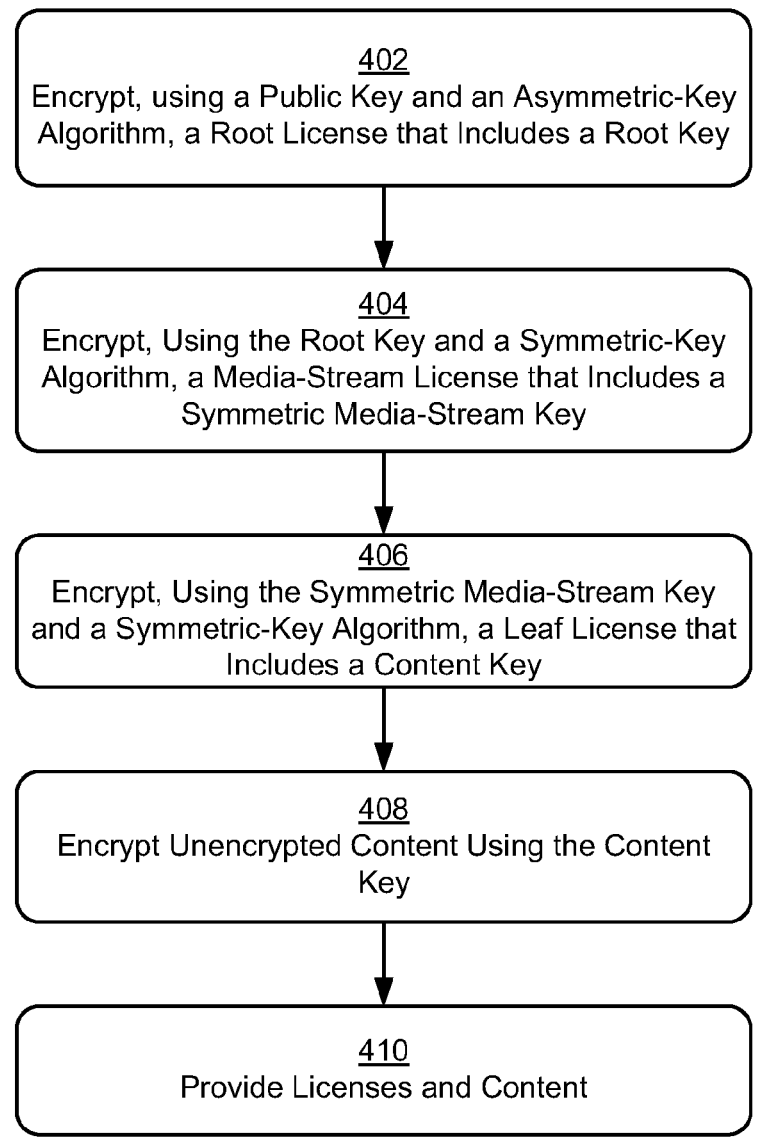
FIG. 4 is a flow diagram depicting an example process for applying digital rights management to a media stream from the perspective of an entity providing licenses.

FIG. 4 is a flow diagram depicting an example process 400 for applying digital rights management to a media stream. In this process 400, an encryption scheme having three levels is applied, though additional levels are contemplated. Here the levels are described as licenses, namely a root license associated with and governing a device or user of the device, a media-stream license associated with and governing permitted uses of a particular media stream, such as a television channel, and a leaf license associated with and governing permitted uses of a particular block of content of a particular media stream.

Block 402 encrypts, using a public key and an asymmetric-key algorithm, a root license that includes a root key. This public key can be used to encrypt information such that only a device having a private key paired to the public key may decrypt that information. This asymmetric-key algorithm is used because, while computationally more expensive that a symmetric-key algorithm, it enables decryption only using the private key and without requiring a shared secret. Conversely, a symmetric-key algorithm relies on a shared secret, which can be cryptographically undesirable outside of some secure way in which to transfer such secret. Here a root key is used but is transferred using a root license encrypted with an asymmetric-key algorithm, which provides a secure way in which to transfer the root key.

Figure 5:
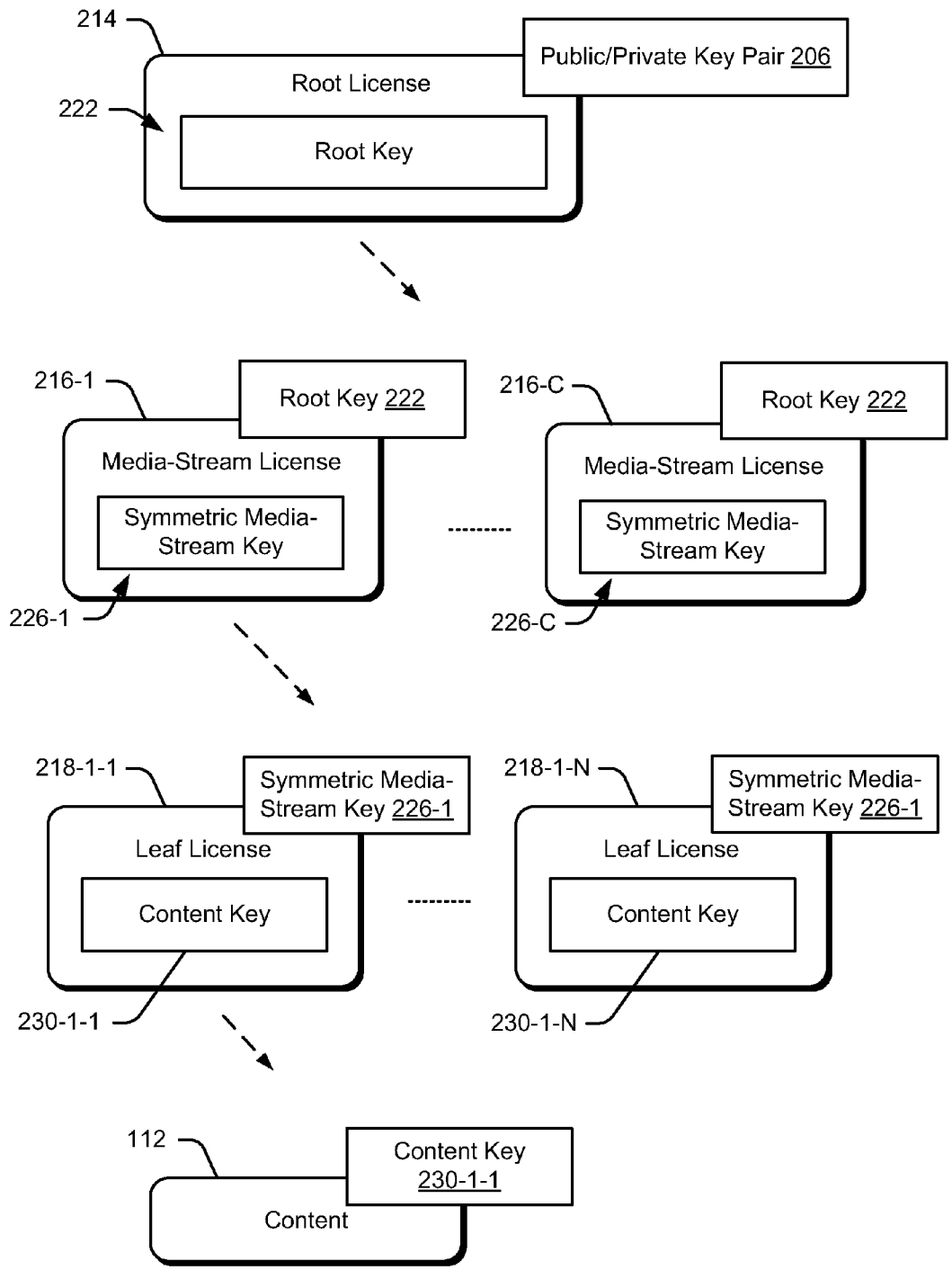
FIG. 5 illustrates three license levels: a root license; a media-stream license; and a leaf license.

By way of example, consider process 400 in the context of environment 100. Here license provider 104 receives public key 108 from computing device 102. Encryption module 306 then encrypts root key 222 and root policy 220 as root license 214 using public key 108 and an asymmetric-key algorithm. Encryption module 306 includes root key 222, which is associated with and can be used to decrypt media-stream licenses (e.g., those associated with channels 122). These licenses are further illustrated in part in FIG. 5. FIG. 5 shows root license 214 having root key 222 and encrypted using public key 108 of public/private key part 206.

FIG. 5 also shows symmetric media stream keys 226 of symmetric media-stream licenses 216, each associated with a media stream that a user of computing device 102 has a right to use. Each symmetric media-stream licenses 216 may be received from a provider of the stream, such a provider of a television channel for each channel provided. They may instead be created by encryption module 306. They may also be periodically received or created, such as a new symmetric media-stream key 226 being received for a particular stream every eight hours. In such a case media-stream license 216 may be periodically recreated, a first media-stream license 216 having a symmetric media-stream key usable to decrypt leaf licenses governing content for a first eight-hour period and the second governing a next eight-hour period.

Block 404 encrypts, using a root key and a symmetric-key algorithm, a media-stream license that includes a symmetric media-stream key. Here encryption module 306 encrypts symmetric media-stream key 226 (and media-stream policy 224, not shown in FIG. 5) into media-stream license 216 using root key 222 encrypted into root license 214 at block 402. As illustrated in FIG. 5, root key 222 is used to encrypt numerous media-stream licenses 216. This example assumes that there are 1 to C media streams and thus C media-stream licenses 216, the media-stream licenses 216 marked as 216-1 to 216-C and symmetric media-stream keys marked as 226-1 to 226-C.

Block 406 encrypts, using the symmetric media-stream key and a symmetric-key algorithm, a leaf license that includes a content key. Each leaf license governs a portion of content of a media stream. In this ongoing example, encryption module 306 encrypts different symmetric content keys 230 (and leaf policy 228, not shown) into different leaf licenses 218. Each of these leaf licenses 218 governs a portion of the media content provided by one of channels 122 of FIG. 1. As illustrated in FIG. 5, one of media-stream licenses 216 (e.g., 216-1), includes symmetric media-stream key 226-1, which governs multiple leaf licenses 218 (here 1 to N leaf licenses 218, the set of leaf licenses 218 indicated as 218-1 to show relationship with media-stream license 216-1). Thus, one leaf license 218 may govern a thirty-minute block of content (e.g., content 112-1 or content 112-C of FIG. 1), be encrypted using symmetric media-stream key 226-1-1, and have a unique symmetric content key 230 (here 230-1-1).

As noted in part above, these licenses have three levels, one of which is encrypted using an asymmetric-key algorithm and the other two using symmetric-key algorithms (which may be substantially similar or different symmetric-key algorithms). This scheme permits a computing device to securely receive a highest-level license (root license 214) decrypt it, and once decrypted, decrypt a lower-level license (media-stream license 216). This media-stream license 216, once decrypted, permits decryption of a still lower-level license (leaf license 218), which, once decrypted, permits decryption of encrypted content, such as a portion of a media stream.

Block 408 may optionally encrypt unencrypted content with a symmetric content key of the leaf license. In some embodiments license provider 104 encrypts the licenses and content, while in some others the content is encrypted separately. License provider 104 may also provide the content once encrypted or this may be done with a separate entity (e.g., a server remote from license server 104 and computing device 102).

In the ongoing embodiment, license provider 104 receives unencrypted content 308 in real time from a media stream and over network 106 (or receives it encrypted, decrypts it, and then re-encrypts it) and encrypts unencrypted content 308 using the appropriate symmetric content key 230. Here the key is the first of the symmetric content keys 230 of the first of the leaf licenses 218 of the first media-stream license 216 (thus symmetric content key 230-1-1, leaf license 218-1-1, and media-stream license 216-1). By so doing, license provider 104 is able to provide content 112-1 for television channel 122-1 to computing device 102 that can be decrypted securely, using a symmetric-key algorithm, and for a particular television channel, portion of the channel, and bound to computing device 102 or its user.

Block 410 provides the licenses and, optionally, the content. Block 410 may provide some of the licenses prior to the content, thereby enabling a receiving device to perform some decryption and other preparations prior to receiving content. This may enable devices to more quickly decrypt content. Here license provider 104 provides to computing device 102 root license 214 and media-stream license 216, root license 214 being bound to computing device 102. License provider 104 may provide leaf licenses 218 in band with content 112 to which each leaf license 218 is associated.

Process 400 may perform a different asymmetric-key algorithm (in that it uses a different asymmetric key) for each user but may forgo repeatedly encrypting the same content, leaf licenses, and/or media-stream licenses. By so doing, process 400 can provide media streams for numerous users or devices.

In some cases operations of process 400 are repeated periodically (for one or many users), such as to provide a new root license every twenty-four hours to a device, a new media-stream license every eight hours (for each media stream), and new leaf licenses every thirty minutes. By so doing additional security may be obtained. These periodic repeats, however, may be the same over all users. Other aspects of these techniques and apparatuses for applying DRM to media streams are set forth as part of process 600 below.

Figure 6:
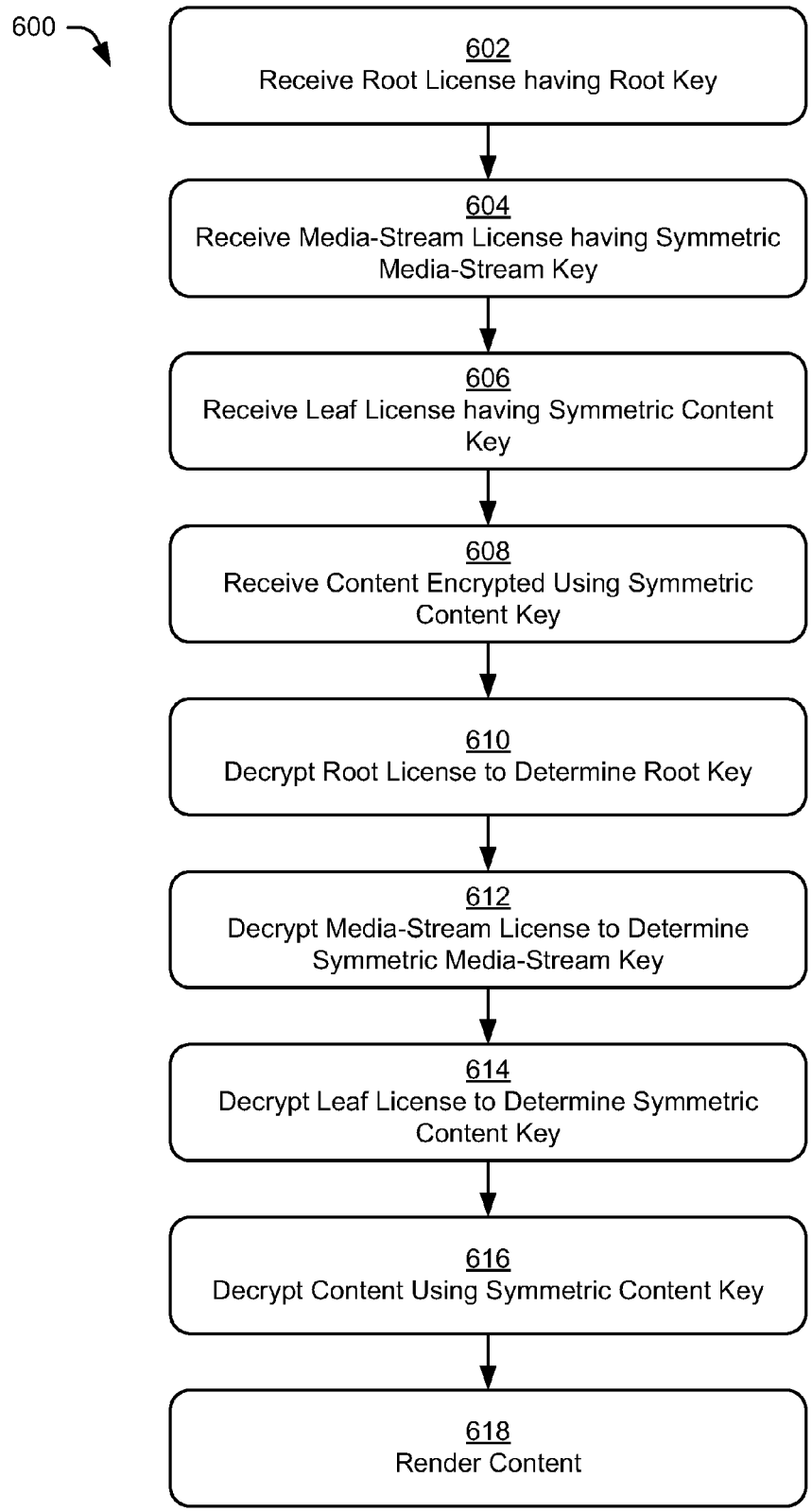
FIG. 6 is a flow diagram depicting an example process for applying digital rights management to a media stream from the perspective of an entity receiving licenses and decrypting content.

FIG. 6 is a flow diagram depicting an example process 600 for applying digital rights management to a media stream, in this case from the perspective of an entity receiving licenses and decrypting content. Process 600 assumes an encryption scheme having three levels, though additional levels are contemplated.

Block 602 receives a root license encrypted using a public key of a public/private key pair and including a root key. Here computing device 102 receives root license 214, root license 214 being bound to computing device 102 by being encrypted using public key 108 of public/private key pair 206. To the extent that only computing device 102 has private key 212, only computing device 102 may decrypt root license 214. While not illustrated for brevity here, in some cases computing device 102 provides public key 108 to license provider 104 prior to receiving root license 214.

Block 604 receives a media-stream license encrypted using the root key and including a symmetric media-stream key. Here computing device 102 receives, from license provider 104, media-stream license 216 having media-stream policy 224 and symmetric media-stream key 226. As noted above, computing device 102 may receive multiple media-stream licenses 216, each governing a different media stream, such as example television channels 122 of FIG. 1.

Block 606 receives a leaf license having a symmetric content key, the leaf license encrypted using the symmetric media-stream key. Here computing device 102 receives, from license provider 104, leaf license 218 having leaf policy 228 and symmetric content key 230. In some cases a single leaf license 218 is sufficient for an extended amount of content 112 from a media stream, such as when content 112 is a twenty-four hour period of content from television channel 122-1. The period for which content key 130 may be used to decrypt can be adjusted by license provider 104, however, and may be a shorter or longer period. For a thirty-minute period, there are forty-eight blocks of content 112 for each television channel 122 per day. As noted elsewhere herein, receiving leaf license 218 may be responsive to computing device 102 tuning to the media stream having content 112 associated with that leaf license 218.

Block 608 receives media content encrypted using the symmetric content key. Here computing device 102 receives, from a remote source (e.g., license provider 104) and over network 106, content 112 for television channel 122. Multiple blocks of content 112 can be received, such as when computing device 102 has multiple tuners, or over some amount of time when computing device 102 is tuned to various channels, such as when a user is surfing channels 122. Each content 112 is encrypted using a different symmetric content key 230 (e.g., 230-1-1 through 230-1-N for television channel 122-1 and so forth).

Block 610 decrypts the root license using a private key of the public/private key pair to determine the root key. Here computing device 102 uses private key 212 to decrypt root license 214, thereby determining root key 222.

Block 612 decrypts the media-stream license using the root key to determine the symmetric media-stream key. Here computing device 102 uses root key 222 to decrypt the received media-stream licenses 216. Computing device 102 may decrypt and cache root license 214 and media-stream licenses 216 prior to receiving content 112 and/or leaf license 218, which may permit faster decryption of leaf licenses 218 and content 112. With the media-stream licenses 216 decrypted, computing device 102 has numerous symmetric media-stream keys 226 by which to decrypt symmetric leaf licenses 218.

Block 614 decrypts one of the leaf licenses using one of the symmetric media-stream keys to determine one of the symmetric content keys. In some cases root license 214 and media-stream license 216 are received and decrypted prior to receiving leaf licenses 218 and content 112. In such a case computing device 102 may tune to a media stream (e.g., one of channels 122 of FIG. 1) and receive one of leaf licenses 218 in band with the content 112 associated with that leaf license 218.

Block 616 decrypts the content using the symmetric content key. In the example where computing device 102 receives leaf license 218 in-band with the associated content 112, computing device 102 may have previously decrypted media-stream license 216 to determine symmetric media-stream key 226, and using symmetric media-stream key 226 decrypt symmetric content key 230, and then use symmetric content key 230 to decrypt content 112. In some cases leaf licenses 218 are received out of band or prior to receiving associated content. In such a case each content 112 may by decrypted using its associated symmetric content key 230 through some information relating symmetric content keys 230 to associated content 112, such as through leaf policy 228.

Block 618 renders the decrypted content. Thus, following decryption of content 112, computing device 102 may render content 112, thereby permitting the user to enjoy the content, such as listen to music or watch a football game via a television channel. As noted above, process 600 may permit fast decryption of leaf licenses 218 and content 112, thereby enabling computing device 102 to render content 112 without a user-perceptible delay between when a user selects that media stream having content 112 and computing device 102 rendering that content 112.

Aspects of process 600 can be performed repeatedly, such as responsive to how often various licenses are received, such as root license 214 once each day, media-stream licenses 216 three times each day, and leaf license 218 every thirty minutes for each media stream being received.

By way of further example, consider a case where the number of media streams is 1,000 (C=1,000), content 112 for each media stream lasts thirty minutes, for 48 blocks of content 112 per media stream per day (T=48), and that each content 112 is associated with one leaf license 218 that is encrypted using a symmetric-key algorithm (Algorithm type=S). Assume also that for each media stream (C) three media-stream licenses 216 are provided per day (one every eight hours, L=3) and that all are encrypted using a symmetric-key algorithm (Algorithm type=S). Assume also that the number of computing devices 102 is 100,000 (U=100,000), that one root license 214 is provided for each user each day (R=1), and that each root license 214 is encrypted using an asymmetric-key algorithm (Algorithm type=A). Lastly, assume that an asymmetric-key algorithm generally takes about 100 times more computational resources than a symmetric-key algorithm (S=A/100). Computational resources (Resources) uses in this scenario, in units of A, are:

$$Resources = C*T*S + C*L*S + U*R*A = C*T*A/100 + C*L*A/100 + U*R*A$$

$$Resources = 1,000*48*A/100 + 1,000*3*A/100 + 100,000*1*A$$

$$Resources = 480A + 30A + 100,000A = 100,510A$$

Contrast this with a similar scenario in which each block of content 112 is encrypted with an asymmetric-key algorithm, as contemplated using a conventional DRM system. In such a case the computational resources for this conventional application of DRM (Conventional Resources) would be the number of blocks of content (C*T) times an asymmetric-key algorithm's computational cost (A) times the number of users (U) for:

$$Conventional\ Resources = C*T*A*U$$

$$Conventional\ Resources = 1,000*48*A*100,000$$

$$Conventional\ Resources = 4,800,000,000A (4.8\ Billion\ A)$$

The difference, at least given all of these assumptions, is a reduction of about 47,750 times fewer resources each day when using an embodiment of the techniques described herein.

Note that these techniques permit a reduction in resources even if the frequency at which various licenses are provided is dramatically increased. Consider, for example, a situation in which media-stream licenses 216 are provided very often, namely one every four seconds (L=21,600 in a 24-hour period).

In this case, as calculated in part below, the reduction is about 15,000 times fewer resources each day:

$$Resources = C*T*S + C*L*S + U*R*A = C*T*A/100 + C*L*A/100 + U*R*A$$

$$Resources = 1,000*48*A/100 + 1,000*21,600*A/100 + 100,000*1*A$$

$$Resources = 480A + 216,000A + 100,000A = 316,480A$$

$$Reduction = 4,800,000,000A/316,480A = 15,166$$

One advantage of increasing the frequency at which licenses are provided is that an amount of content that can be lost is limited to the period or some small number of periods. In this example, the amount of content lost if a license is cryptographically compromised is two times the period at which media-stream licenses 216 is provided, namely eight seconds.

Further still, even when the ratio of computing resources used is lower (e.g., ten times more computational resources for an asymmetric-key algorithm than a symmetric-key algorithm, S=A/10), when there are only twenty channels (C=20), and when content 112 is two hours long (T=12), the Resources and Conventional Resources are still:

$$Resources = C*T*S + C*L*S + U*R*A = C*T*A/10 + C*L*A/10 + U*R*A$$

$$Resources = 20*12*A/10 + 20*3*A/10 + 100,000*1*A$$

$$Resources = 24A + 6A + 100,000A = 100,030A$$

$$Conventional\ Resources = C*T*A*U$$

$$Conventional\ Resources = 20*12*A*100,000$$

$$Conventional\ Resources = 24,000,000A (24\ Million\ A)$$

This assumes that the other factors remain the same (U=100,000, L=2, R=1). Based on these assumptions, the difference is a reduction of about 240 times fewer resources each day when using an embodiment of the techniques described herein.

Conclusion

This document describes techniques and apparatuses for applying digital rights management (DRM) to media streams. These techniques permit application of DRM to media streams without undue use of computing resources. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   encrypting, by a licensing server, using a public key of a public/private key pair and an asymmetric-key algorithm, a root license that includes a root key;
   encrypting, using the root key and a first symmetric-key algorithm, a media-stream license that includes a symmetric media-stream key;
   encrypting, using the symmetric media-stream key and a second symmetric-key algorithm, a leaf license that includes a content key, the leaf license provided in-band with content provided to a computing device;
   providing, by the licensing server and prior to providing content encrypted with the content key, the root license, the media-stream license, and the leaf license, the providing effective to enable the computing device having a private key of the public/private key pair and the content encrypted with the content key to decrypt the content;
   repeating the act of encrypting the root license after a first period, repeating the act of encrypting the media-stream license after a second period, and repeating the act of encrypting the leaf license after a third period, the first period longer than the second period, the second period longer than the third period; and
   limiting a loss of the decrypted content due to a single cryptographic compromise of one of the root license, the media-stream license, or the leaf license, the loss limited to an amount of the decrypted content lasting two times the second period.

2. The method as recited in claim 1, wherein the root license includes a root policy associated with a user, the media-stream license includes a media-stream policy associated with a media stream, and the leaf license includes a leaf policy associated with the content.

3. The method as recited in claim 1, wherein the root key is used to encrypt multiple symmetric media-stream keys, each of the multiple symmetric media-stream keys associated with one of multiple media-stream licenses, each of the multiple media-stream licenses associated with one of multiple television channels.

4. The method as recited in claim 3, wherein each of the multiple media-stream licenses contains one of the multiple symmetric media-stream keys, the one of the multiple symmetric media-stream keys encrypted by the root key and used to encrypt multiple content keys, each of the multiple content keys associated with one of multiple content of one of the multiple television channels to which the each of the multiple media-stream licenses is associated.

5. The method as recited in claim 1, further comprising performing the act of encrypting the root license multiple times for multiple users, each of the multiple users requiring a different root key but same symmetric media-stream keys and same content keys.

6. The method as recited in claim 1, further comprising encrypting unencrypted content to provide the content, the act of encrypting unencrypted content using the content key.

7. The method as recited in claim 6, further comprising providing the content to the computing device.

8. The method as recited in claim 1, wherein the act of providing the root license, the media-stream license, and the leaf license provides the root license and the media-stream license prior to or at the same time as providing the leaf license.

9. A method comprising:
   receiving, by a computing device, a root license encrypted using a public key of a public/private key pair and including a root key;
   receiving a media-stream license encrypted using the root key and including a symmetric media-stream key;
   receiving a leaf license, in-band with content, having a content key, the leaf license encrypted using the symmetric media-stream key;
   receiving the content encrypted using the content key and prior to receiving the root license, the media-stream license, and the leaf license;
   decrypting, by the computing device, the root license using a private key of the public/private key pair to determine the root key;
   decrypting the media-stream license using the root key to determine the symmetric media-stream key;
   decrypting the leaf license using the symmetric media-stream key to determine the content key;
   decrypting the content using the content key to provide decrypted content; and
   repeating the acts of receiving the root license and decrypting the root license after a first period, repeating the acts of receiving and decrypting the media-stream license after a second period, and repeating the acts of receiving and decrypting the leaf license after a third period; and
   limiting a loss of the decrypted content due to a single cryptographic compromise of one of the root license, the media-stream license, or the leaf license, the loss limited to an amount of the decrypted content lasting two times the second period.

10. The method as recited in claim 9, further comprising providing the public key, the public key associated with the computing device or a user of the computing device.

11. The method as recited in claim 10, wherein the act of providing provides the public key to a remote entity capable of providing the root license, and wherein the acts of receiving the root license, receiving the media-stream license, and receiving the leaf license receive from the remote entity.

12. The method as recited in claim 9, wherein the root key is used to encrypt multiple symmetric media-stream keys, each of the multiple symmetric media-stream keys associated with one of multiple media-stream licenses, each of the multiple media-stream licenses governing use of one of multiple television channels, and the act of decrypting the media-stream license decrypts multiple media-stream licenses to determine the multiple symmetric media-stream keys.

13. The method as recited in claim 9, wherein the media-stream key is used to encrypt multiple content keys, each of the multiple content keys associated with one of multiple leaf licenses, each of the multiple leaf licenses governing use of one block of content of multiple blocks of content.

14. The method as recited in claim 9, wherein the computing device is a set-top box, laptop computer, desktop computer, handheld computer, or cellular phone.

15. The method as recited in claim 9, wherein the acts of decrypting the root license and decrypting the media-stream license are performed prior to or at the same time as receiving the leaf license.

16. The method as recited in claim 15, further comprising rendering the content after the act of decrypting the content, and wherein the acts of decrypting the content and rendering the content are performed without causing a perceptible delay to a user between the tuning to the television channel and the rendering of the content.

* * * * *